（12）United States Patent
Sakamoto et al.

(10) Patent No.: US 12,437,644 B2
(45) Date of Patent: Oct. 7, 2025

(54) VEHICLE MANAGEMENT DEVICE MANAGING PARKING POSITION IN A PARKING LOT AND VEHICLE

(71) Applicant: TOYOTA JIDOSHA KABUSHIKI KAISHA, Toyota (JP)

(72) Inventors: Hideo Sakamoto, Toyota (JP); Yoshinobu Nozaki, Anjyo (JP); Hiroyuki Ogura, Ama (JP); Hisashi Fujisawa, Toyota (JP); Mitsuaki Tomita, Toyota (JP); Yasunobu Seki, Nissin (JP); Shoichi Iwamoto, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/488,280

(22) Filed: Oct. 17, 2023

(65) Prior Publication Data

US 2024/0249622 A1  Jul. 25, 2024

(30) Foreign Application Priority Data

Jan. 24, 2023 (JP) .................................. 2023-008579

(51) Int. Cl.
*G08G 1/14* (2006.01)

(52) U.S. Cl.
CPC ............. *G08G 1/148* (2013.01); *G08G 1/143* (2013.01)

(58) Field of Classification Search
None
See application file for complete search history.

(56) References Cited

U.S. PATENT DOCUMENTS

| | | | | |
|---|---|---|---|---|
| 2010/0169008 | A1* | 7/2010 | Niwa | G09B 29/106 701/532 |
| 2014/0214249 | A1* | 7/2014 | Freeman | B60L 8/003 180/2.2 |
| 2019/0248243 | A1* | 8/2019 | Gaither | B60L 8/003 |
| 2020/0240166 | A1* | 7/2020 | Graner | B60L 55/00 |

FOREIGN PATENT DOCUMENTS

WO  2016/072165 A1  5/2016

* cited by examiner

*Primary Examiner* — John F Mortell
(74) *Attorney, Agent, or Firm* — SoraIP, Inc.

(57) ABSTRACT

A vehicle management device for managing parking positions in a parking lot of a plurality of vehicles equipped with a solar battery and a power storage device for storing electric power generated by the solar battery, wherein based on the conversion efficiency of the solar battery of each vehicle and the sunlight conditions of the parking lot, the parking position of each vehicle is set so that the amount of solar electric power generation by multiple vehicles per unit time or the sum total of the amount of power generated by the solar cells mounted on multiple vehicles is large. As a result, the amount of electric power generated per unit time and the sum of the amount of electric power generated of the vehicles as a whole can be improved.

4 Claims, 3 Drawing Sheets

VEHICLE MANAGEMENT DEVICE MANAGING PARKING POSITION IN A PARKING LOT AND VEHICLE

CROSS-REFERENCE TO RELATED APPLICATION

This application claims priority to Japanese Patent Application No. 2023-008579 filed on Jan. 24, 2023 incorporated herein by reference in its entirety.

BACKGROUND

1. Technical Field

The disclosure relates to a vehicle management device and a vehicle.

2. Description of Related Art

Conventionally, as this type of vehicle management device, a device has been proposed that is equipped with a solar cell and a power storage device (storage battery) that stores electric power generated by the solar cell, and manages vehicles that are capable of automated driving (e.g., see WO2016/072165). When a position at which a vehicle is parked becomes shaded during the time over which the vehicle is left parked by a user, this system relocates the vehicle into the sun by automated driving. Description is made therein that this enables the time during which the vehicle is parked to be used to generate electric power using the solar cell.

SUMMARY

However, the vehicle management device described above does not disclose how to set a parking position for each vehicle when managing a plurality of vehicles. In a parking lot in which multiple vehicles are parked, even when one vehicle is relocated into the sun, an amount of electric power generated per unit time and a sum of the amount of electric power generated by the multiple vehicles as a whole may decrease in some cases when other vehicles are parked in the shade.

A primary object of the vehicle management device according to the disclosure is to improve the amount of electric power generated per unit time and the sum of the amount of electric power generated by the vehicles as a whole.

The vehicle management device and vehicle according to the disclosure employ the following means in order to achieve the above primary object.

The vehicle management device according to the disclosure is a vehicle management device for managing parking positions in a parking lot, with respect to a plurality of vehicles equipped with a solar cell and a power storage device for storing electric power generated by the solar cell. The parking positions of the vehicles are set such that, based on a conversion efficiency of the solar cell of each of the vehicles and a sunlight condition of the parking lot, an amount of electric power generated per unit time in solar electric power generation by the vehicles, or a sum of the amount of electric power generated by the solar cells installed in the vehicles, is great.

In the vehicle management device according to the disclosure, the parking positions of the vehicles are set such that, based on the conversion efficiency of the solar cell of each of the vehicles and the sunlight conditions of the parking lot in which the vehicles are parked, the amount of electric power generated per unit time in solar electric power generation by the vehicles, or the sum of the amount of electric power generated by the solar cells installed in the vehicles, is great. As a result, the amount of electric power generated per unit time and the sum of the amount of electric power generated of the vehicles as a whole can be improved.

Further, in the vehicle management device of the disclosure, the sunlight conditions may be the amount of time of a day in which each parking position is in the sun. Thus, a parking position can be set for each vehicle in accordance the time when in the sun.

In this case, the parking positions of the vehicles may be set such that vehicles having high conversion efficiency of the solar cells installed thereof are parked in the sun for a longer time than vehicles with low conversion efficiency. Thus, the conversion efficiency and the amount of electric power generated can be improved.

Further, in the vehicle management device according to the disclosure, position information of the parking positions that are set may be transmitted to the vehicles. Thus, the vehicles can be parked based on the positional information of the parking positions for the vehicles.

The vehicle according to the disclosure is a vehicle that is managed by the vehicle management device of the disclosure according to an aspect of transmitting position information of a parking position that is set, to the vehicle, and that is equipped with the solar cell and the power storage device, the vehicle including an information notification device that notifies a user of the vehicle of information. The information notification device notifies the user of the position information transmitted by the vehicle management device.

The vehicle according to the disclosure is provided with the information notification device for notifying the user of the vehicle of information. This information notification device notifies the user of the position information transmitted by the vehicle management device. Accordingly, the user of the vehicle can be made aware of the parking position that is set, and the user can be prompted to park the vehicle at the parking position that is set. The user who is prompted to park the vehicle at the parking position that is set is assumed to park the vehicle at the parking position that is set. As a result, the amount of electric power generated per unit time and the sum of the amount of electric power generated of the vehicles as a whole can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with reference to an embodiment.

Figure 1:
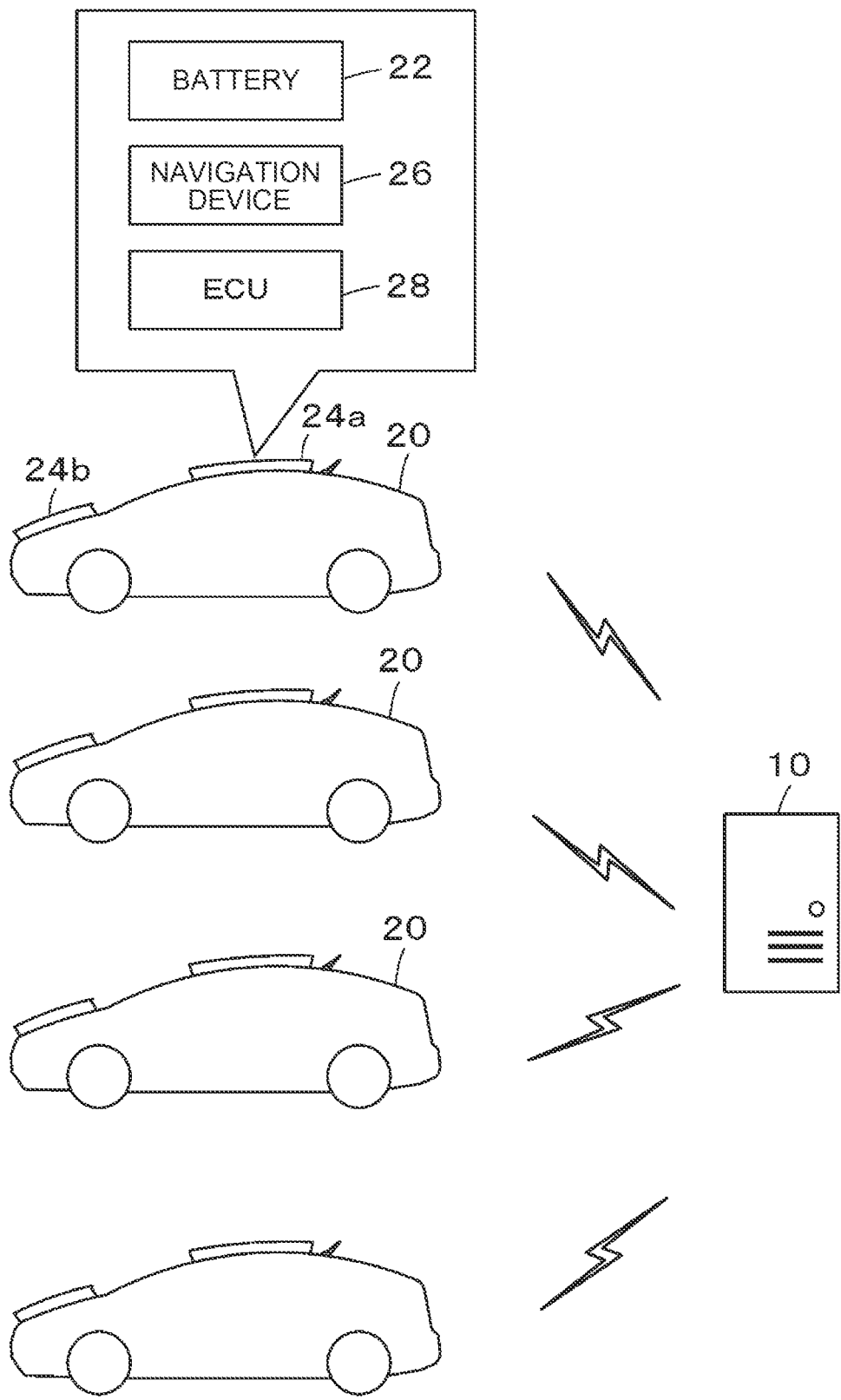
FIG. 1 is a configuration diagram showing an outline of the configuration of a vehicle management device 10 as one embodiment of the present disclosure.

FIG. 1 is a configuration diagram showing an outline of the configuration of a vehicle management device 10 as one embodiment of the present disclosure. The vehicle management device 10 is configured as a device that manages parking positions of a plurality of vehicles 20 in a parking lot P. As the parking lot P, for example, a place used for parking a plurality of predetermined vehicles, such as a factory, a car sharing business, or a rental car business office, can be mentioned.

Each vehicle 20 is configured as a battery electric vehicle that runs on power from a motor, and includes a battery 22 as a power storage device, solar cells 24a and 24b, a navigation device (information notification device) 26, and an electronic control unit (hereinafter referred to as "ECU") 28.

The battery 22 is configured as, for example, a lithium-ion secondary battery or a nickel-hydrogen secondary battery, and exchanges electric power with the motor. The solar cells 24a and 24b are composed of a plurality of solar cells, and supply generated electric power to the battery 22 via an electric power supply device (not shown) to charge the battery 22.

The solar cells 24a, 24b are mounted either on the roof of the vehicle body, on the front hood, on the surface of the rear trunk door, or on the surface of the side door. The types, sizes, and mounting positions of the solar cells 24a and 24b may be different for each vehicle 20, or may be the same.

When the user operates a display (not shown) to set a destination, the navigation device (navigation device) 26 uses stored map information and the current location and destination of the vehicle 20 received from the GPS antenna. A planned travel route from the current location to the destination is set, and the set planned travel route is displayed on a display (not shown) for route guidance.

The Electronic Control Unit (ECU) 28 is configured as a microprocessor centered on a central processing unit (CPU) (not shown), and in addition to the CPU, includes a read only memory (ROM) for storing a processing program, a random access memory (RAM) for storing data in a temporary manner, input/output ports, and communication ports. The ECU 28 is configured to be capable of executing various controls and wirelessly communicating with the vehicle management device 10 via a Data Communication Module (DCM) (not shown).

The vehicle management device 10 is installed in a management center that manages the parking lot P, and is configured as a general-purpose microcomputer centered on a CPU. The vehicle management device 10 is configured to be able to communicate wirelessly with a plurality of vehicles 20. The vehicle management device 10 stores the conversion efficiency Epv of the solar cells 24a and 24b mounted on each vehicle 20.

Figure 2:
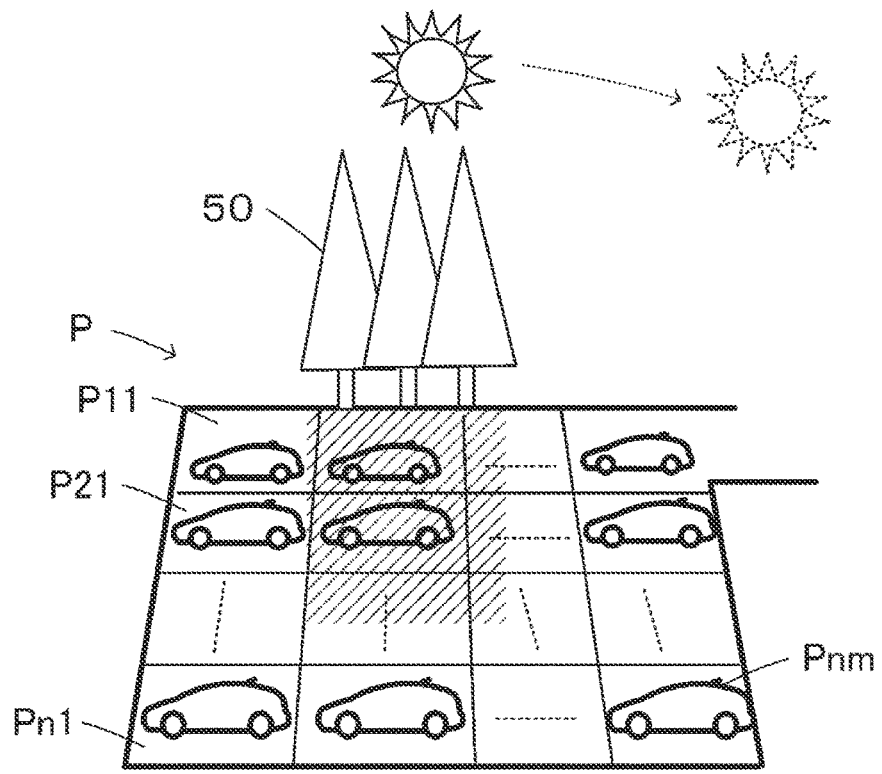
FIG. 2 is an explanatory diagram for explaining an example of how sunshine and shade are formed due to changes in the elevation angle of the sun (insolation angle) in the parking lot P.
Figure 3:
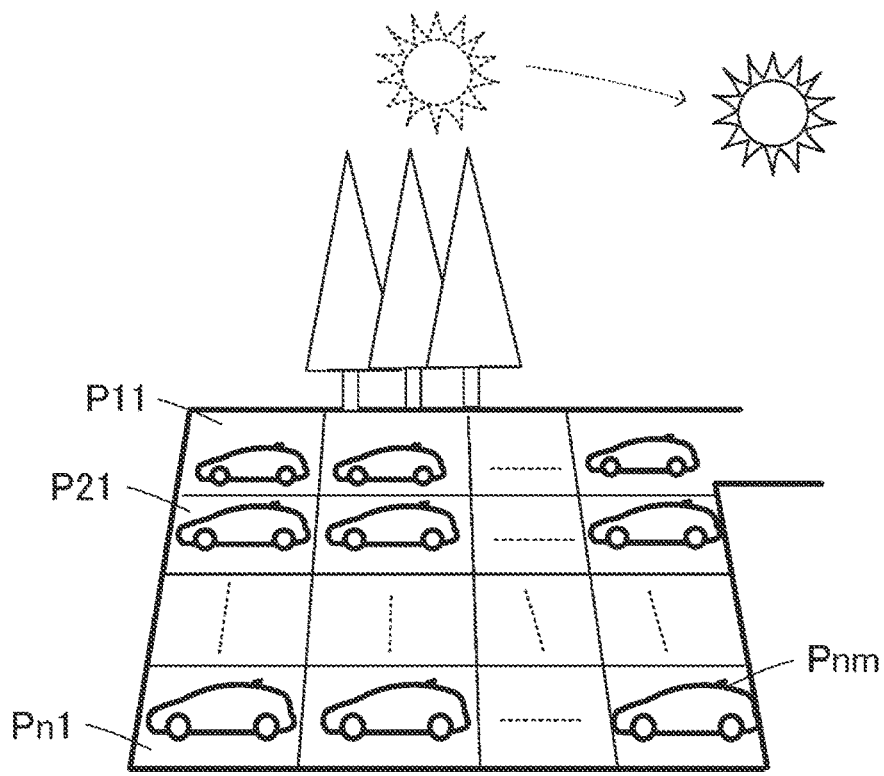
FIG. 3 is an explanatory diagram for explaining an example of how sunshine and shade are formed due to changes in the elevation angle of the sun (insolation angle) in the parking lot P.

The vehicle management device 10 calculates, for every predetermined time (for example, every one day, two days, and three days), the sunshine time (sunlight condition) as the time when the parking positions P11 to Pnm are in the sun during the day, based on information on the position and height of the structure 50 that generates a shade in at least one of the parking positions P11 to Pnm (n and m are values integer of 1 or more) of the parking lot P such as the structure and plant around the parking lot P, and information on the position information (latitude, longitude) of the parking positions P11 to Pnm of the parking lot P and the insolation angle in the parking lot P, and sets R1 to RL (value L is a value obtained by multiplying value n by value m) in descending order of time with many sunshine times regarding the parking positions P11 to Pnm. FIG. 2 and FIG. 3 are explanatory diagrams for explaining an example of how sunshine and shade are formed due to changes in the elevation angle of the sun (insolation angle) in the parking lot P. When there is a structure 50 around the parking lot P, at least one of the parking positions P11 to Pnm of the parking lot P may be shaded, as shown in FIG. 2, and as shown in FIG. 3, all parking positions P11-Pnm may be in the sun. The vehicle management device 10 calculates the hours of sunlight for each of the parking positions P11 to Pnm in consideration of such differences in sunlight at each of the parking positions P11 to Pnm. As for the sunshine hours at the parking positions P11 to Pnm, where part of the day is in the sun and the rest is in the shade, a predetermined percentage of the time period less than 1 is in the sunshine. Assuming that it is, calculate the sunshine time. Further, for parking positions with the same daylight hours, the one closer to the entrance of the parking lot P is ranked higher, but the one farther from the entrance of the parking lot P may be ranked higher.

Figure 4:
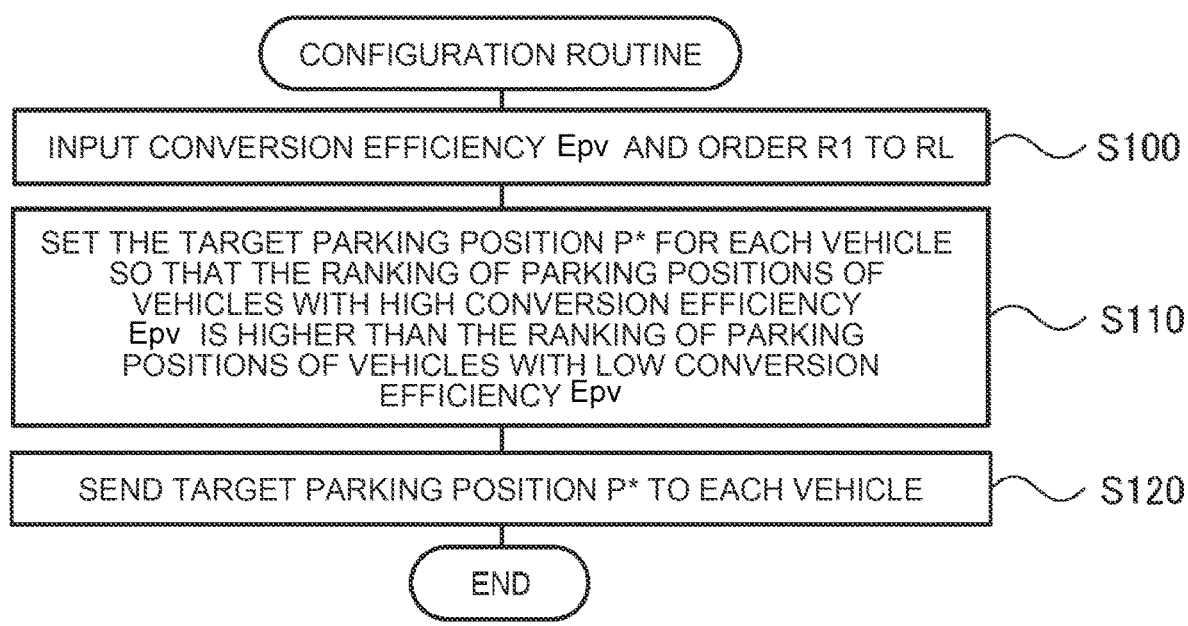
FIG. 4 is a flowchart showing an example of a setting routine for setting a parking position executed by the vehicle management device 10.

Next, the operation of the vehicle management device 10 configured in this manner, in particular, the operation of setting the parking position of each vehicle 20 in the parking lot P will be described. FIG. 4 is a flowchart showing an example of a setting routine for setting a parking position executed by the vehicle management device 10. This process is executed every predetermined time (for example, every 1 day, 2 days, 3 days, etc.).

When this routine is executed, a process of inputting the conversion efficiency Epv of each vehicle 20 and the sunshine time order R1 to Rl of each parking position P11 to Pnm is executed (S100). Then, the target parking position of each vehicle 20 is set so that the ranking of the daylight hours of the parking position of the vehicle 20 with the high conversion efficiency Epv is higher than the ranking of the daylight hours of the parking position of the vehicle 20 with the low conversion efficiency Epv. P* is set (S110), the set target parking position P* is transmitted to each vehicle 20 (S120), and this routine ends. Upon receiving the target parking position P*, the ECU 28 of each vehicle notifies the user of the parking position by displaying the received target parking position P* on a display (not shown) of the navigation device 26. Thereby, the user of the vehicle 20 can be urged to park at the target parking position P*. In this way, a vehicle 20 with a high conversion efficiency Epv is parked in the sun longer than a vehicle 20 with a low conversion efficiency Epv. Considering the plurality of vehicles 20 as a whole, the power generation amount per unit time of the solar electric power generation by the plurality of vehicles 20 or the sum of the power generation amounts is large as compared with a case in which the vehicle 20 with a low conversion efficiency EPV is parked in the sun for a longer period of time. Therefore, it is possible to improve the power generation amount per unit time and the total power generation amount of the plurality of vehicles 20 as a whole.

According to the vehicle management device 10 of the embodiment described above, solar electric power generation by the plurality of vehicles 20 is performed based on the conversion efficiency Epv of the solar cells 24a and 24b of the vehicles 20 and the sunlight time of the parking lot P. By setting the target parking position P* of each vehicle 20 so that the amount of power generation per unit time at or the sum of the amounts of power generation of the solar cells 24a and 24b mounted on the plurality of vehicles 20 is large, the plurality of vehicles 20 as a whole, the power generation amount per unit time and the total power generation amount can be improved.

Vehicles 20 equipped with solar cells 24a and 24b with high conversion efficiency Epv are parked in the sun longer than vehicles 20 with solar cells 24a and 24b with low conversion efficiency Epv. Since the target parking position P* is set at, the power generation amount per unit time and the total power generation amount of the plurality of vehicles 20 as a whole can be improved.

Furthermore, according to the vehicle 20 of the embodiment, since the navigation device 26 notifies the user of the target parking position P* (position information) transmitted by the vehicle management device 10, the number of vehicles 20 as a whole unit time It is possible to improve the power generation amount per unit and the total power generation amount.

The correspondence between the main elements of the embodiment and the main elements of the disclosure described in SUMMARY will be described. In the embodiment, the vehicle management device 10 corresponds to the "vehicle management device".

As for the correspondence between the main elements of the embodiment and the main elements of the disclosure described in SUMMARY, since the embodiment is an example for specifically describing a mode for carrying out the disclosure described in SUMMARY, the embodiment does not limit the elements of the disclosure described in SUMMARY. In other words, the interpretation of the disclosure described in SUMMARY should be performed based on the description in SUMMARY, and the embodiment is merely a specific example of the disclosure described in SUMMARY.

Although a mode for carrying out the present disclosure has been described above with reference to the embodiment, the present disclosure is not limited to the embodiment, and it goes without saying that the present disclosure can be carried out in various modes without departing from the gist of the present disclosure.

The present disclosure is applicable to vehicle management devices, vehicle manufacturing industries, and the like.

What is claimed is:

1. A vehicle management device for managing parking positions in a parking lot, with respect to a plurality of vehicles equipped with a solar cell and a power storage device for storing electric power generated by the solar cell, wherein the parking positions of the vehicles are set such that, based on a conversion efficiency of the solar cell of each of the vehicles and a sunlight condition of the parking lot, vehicles equipped with the solar cells that have the conversion efficiency that is high are parked in the sun for a longer time than the vehicles equipped with the solar cells that have the conversion efficiency that is low, and the sunlight condition is the amount of time of a day in which each parking position is in the sun.

2. The vehicle management device according to claim 1, wherein position information of the parking positions that are set is transmitted to the vehicles.

3. A vehicle that is managed by the vehicle management device according to claim 2, and is equipped with the solar cell and the power storage device, the vehicle comprising an information notification device that notifies a user of the vehicle of information, wherein the information notification device notifies the user of the position information transmitted by the vehicle management device.

4. A vehicle management device for managing parking positions in a parking lot, with respect to a plurality of vehicles equipped with a solar cell and a power storage device for storing electric power generated by the solar cell, wherein the parking positions of the vehicles are set such that, based on a conversion efficiency of the solar cell of each of the vehicles and a sunlight condition of the parking lot, vehicles equipped with a first solar cells are parked in the sun for a longer time than the vehicles equipped with a second solar cells, the first solar cells have a conversion efficiency that is higher than that of the second solar cells, and the sunlight condition is the amount of time of a day in which each parking position is in the sun.

* * * * *